(12) United States Patent
Pandit et al.

(10) Patent No.: US 9,223,530 B2
(45) Date of Patent: Dec. 29, 2015

(54) MULTI-TIERED CONSTRAINT CHECKING FOR MANAGING PRINT JOBS

(75) Inventors: Rakesh Pandit, Irvine, CA (US); Geoff W. Harmon, Mission Viejo, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 1382 days.

(21) Appl. No.: 12/037,529

(22) Filed: Feb. 26, 2008

(65) Prior Publication Data

US 2009/0217268 A1 Aug. 27, 2009

(51) Int. Cl.
*G06K 15/10* (2006.01)
*G06F 3/12* (2006.01)

(52) U.S. Cl.
CPC .............. *G06F 3/1288* (2013.01); *G06F 3/126* (2013.01); *G06F 3/1207* (2013.01); *G06F 3/1237* (2013.01); *G06F 3/1241* (2013.01); *G06F 3/1255* (2013.01); *G06F 3/1256* (2013.01); *G06F 3/1259* (2013.01)

(58) Field of Classification Search
None
See application file for complete search history.

(56) References Cited

U.S. PATENT DOCUMENTS

| | | | | |
|---|---|---|---|---|
| 5,129,639 | A * | 7/1992 | DeHority | 270/1.01 |
| 6,075,617 | A * | 6/2000 | Fischer et al. | 358/1.16 |
| 6,115,544 | A * | 9/2000 | Mueller | 714/57 |
| 6,279,124 | B1 * | 8/2001 | Brouwer et al. | 714/38.11 |
| 6,498,611 | B1 | 12/2002 | Beard et al. | |
| 6,549,947 | B1 * | 4/2003 | Suzuki | 709/229 |
| 6,718,490 | B1 * | 4/2004 | Takemoto et al. | 714/47.1 |
| 6,771,378 | B2 | 8/2004 | Akiyama et al. | |
| 6,975,417 | B1 * | 12/2005 | Hilpl et al. | 358/1.15 |
| 7,136,941 | B2 | 11/2006 | Nguyen et al. | |
| 7,191,236 | B2 | 3/2007 | Simpson-Young et al. | |
| 8,108,256 | B2 * | 1/2012 | Korhonen | 705/14.49 |
| 2002/0076252 | A1 * | 6/2002 | Mantell | 400/702.1 |
| 2002/0089688 | A1 * | 7/2002 | Ferlitsch et al. | 358/1.15 |
| 2002/0089692 | A1 * | 7/2002 | Ferlitsch | 358/1.15 |
| 2002/0116291 | A1 * | 8/2002 | Grasso et al. | 705/27 |
| 2002/0118382 | A1 | 8/2002 | Jackelen | |
| 2003/0007177 | A1 * | 1/2003 | Ferlitsch | 358/1.15 |
| 2003/0011805 | A1 | 1/2003 | Yacoub | |
| 2003/0103235 | A1 | 6/2003 | Gomi | |
| 2003/0182378 | A1 | 9/2003 | Treptow et al. | |
| 2003/0197320 | A1 * | 10/2003 | Hoblit | 270/1.01 |
| 2003/0228183 | A1 * | 12/2003 | Tjan | 400/76 |
| 2004/0061890 | A1 * | 4/2004 | Ferlitsch | 358/1.15 |
| 2004/0111418 | A1 | 6/2004 | Nguyen et al. | |
| 2004/0165209 | A1 * | 8/2004 | Aoki et al. | 358/1.14 |
| 2004/0179230 | A1 * | 9/2004 | Kitada et al. | 358/1.15 |

(Continued)

*Primary Examiner* — Hiren Patel
(74) *Attorney, Agent, or Firm* — Chen Yoshimura LLP

(57) ABSTRACT

A method implemented in a print job management apparatus for processing print jobs in a multiple-printer print shop environment is described. When an operator manually assigns a print job to a printer, the print job requirements are compared with capabilities of the printer to detect any constraints (i.e. incompatibilities between printer capabilities and print job requirements). The job is printed if no constraint is detected. If a constraint of a first category is detected (e.g. incompatible color capabilities, paper size and type, layout, etc.), printing will not proceed and an error message is displayed. If a constraint of a second category is detected (e.g. inadequate finishing capabilities), a warning message is displayed with a request for operator instruction regarding whether to proceed with printing. If the operator chooses to proceed, the job will be printed, and a banner page containing instructions regarding uncompleted job requirements is generated.

6 Claims, 3 Drawing Sheets

(56) References Cited

U.S. PATENT DOCUMENTS

| | | | |
|---|---|---|---|
| 2004/0190042 A1* | 9/2004 | Ferlitsch et al. | 358/1.15 |
| 2004/0190057 A1* | 9/2004 | Takahashi et al. | 358/1.15 |
| 2004/0257606 A1* | 12/2004 | Bergstrand et al. | 358/1.15 |
| 2004/0267868 A1* | 12/2004 | Wilk | 709/200 |
| 2005/0068562 A1* | 3/2005 | Ferlitsch | 358/1.14 |
| 2005/0081215 A1* | 4/2005 | Jenkins | 719/313 |
| 2005/0099649 A1* | 5/2005 | Ferlitsch et al. | 358/1.15 |
| 2005/0128512 A1 | 6/2005 | Kurotsu | |
| 2005/0168765 A1* | 8/2005 | Akune et al. | 358/1.13 |
| 2005/0185222 A1* | 8/2005 | Sammis et al. | 358/2.1 |
| 2005/0203805 A1* | 9/2005 | Clough et al. | 705/26 |
| 2005/0210227 A1 | 9/2005 | Emerson et al. | |
| 2005/0275869 A1* | 12/2005 | Yokoyama | 358/1.14 |
| 2006/0012807 A1* | 1/2006 | Bos et al. | 358/1.8 |
| 2006/0023230 A1* | 2/2006 | Nakata | 358/1.6 |
| 2006/0028667 A1* | 2/2006 | Saito | 358/1.13 |
| 2006/0039707 A1* | 2/2006 | Mima | 399/23 |
| 2006/0114490 A1* | 6/2006 | Rolleston | 358/1.14 |
| 2006/0221354 A1* | 10/2006 | Slaten et al. | 358/1.1 |
| 2006/0279779 A1* | 12/2006 | Kaufman et al. | 358/1.15 |
| 2007/0024895 A1* | 2/2007 | Clark | 358/1.15 |
| 2007/0103719 A1* | 5/2007 | Azuchi | 358/1.15 |
| 2007/0229860 A1* | 10/2007 | Matsubara et al. | 358/1.9 |
| 2007/0229878 A1* | 10/2007 | Pandit et al. | 358/1.15 |
| 2007/0229879 A1* | 10/2007 | Harmon et al. | 358/1.15 |
| 2007/0229880 A1* | 10/2007 | Harmon et al. | 358/1.15 |
| 2007/0229881 A1* | 10/2007 | Matsubara et al. | 358/1.15 |
| 2007/0229883 A1* | 10/2007 | Fujimori et al. | 358/1.15 |
| 2007/0229895 A1 | 10/2007 | Fujimori et al. | |
| 2007/0229896 A1* | 10/2007 | Fujimori et al. | 358/1.16 |
| 2009/0021757 A1* | 1/2009 | Liu et al. | 358/1.13 |
| 2009/0201528 A1* | 8/2009 | Truong | 358/1.15 |
| 2009/0290186 A1* | 11/2009 | Rocas | 358/1.15 |

* cited by examiner

FIG. 3

MULTI-TIERED CONSTRAINT CHECKING FOR MANAGING PRINT JOBS

BACKGROUND OF THE INVENTION

1. Field of the Invention

This invention relates to print job processing method and apparatus, and more particularly, to print job processing method and apparatus for a print shop employing multiple printers as well as inline and offline finishing devices.

2. Description of Related Art

In an environment that processes a large number of print jobs with multiple printers, there has been a need to manage print jobs efficiently in an organized fashion. Examples of such an environment are professional print shops and print/copy departments at large organizations, where a variety of print requests, such as large-volume duplication and large document printing, needs to be processed and completed by utilizing multiple printers within a short turn-around time. These environments are collectively referred to as "print shops" in this application. Typically, each printing job specifies a source file that electrically contains a document to be printed, the size, color and the type of the paper on which the document should be printed, the printing resolution, duplex or single-side printing, and certain finishing conditions, such as book, staple, collate printing, etc., depending on a print job requester's needs. In order to process a large volume of print jobs that each differ in terms of these job parameters, a print shop utilizes multiple commercial grade printers. Typically, one or more black & white (B&W) printers are in operation to process B&W printing. Color printers are also installed to handle color printing. Each of these printers, however, has limitations on available printer settings, such as the paper size, the paper type, resolution settings, etc. In addition, the print shop employs various finishing devices, such as collators, staplers, hole punchers, folding machines, binding machines, etc. These finishing devices are either mechanically and electrically associated with printers (referred to as "inline" finishing devices), or stand-alone devices (referred to as "offline" finishing devices). For an inline finishing device, printed sheets from the associated printer can be automatically routed to the finishing device and no operator intervention is necessary to complete the finishing step. For an offline finishing device, on the other hand, the operator normally need to manually transport the output of a printer to the finishing device and initiate the finishing step. When a large volume of printing jobs is to be handled with multiple printers and finishing devices, it is a daunting task to assign each printing job to an appropriate printer with appropriate finishing devices.

SUMMARY OF THE INVENTION

Accordingly, the present invention is directed to a print job processing method and apparatus that substantially obviates one or more of the problems due to limitations and disadvantages of the related art.

An object of the present invention is to provide an improved print job processing method and apparatus.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present invention provides a method for processing a print job implemented in a print job management apparatus for managing a plurality of printing devices, which includes: (a) receiving an assignment of a print job to a selected printing device, the print job specifying job ticket parameters representing printing requirements; (b) comparing the printing requirements with capabilities of the selected printing device to detect any constrains between the printing requirements and the capabilities of the selected printing device; (c) if no constraint is detected, submitting the print job to the selected printing device; (d) if a constraint of a first category is detected, displaying an error message indicating that printing fails to proceed and indicating a nature of the detected constraint, without submitting the print job to the selected printing device; (e) if a constraint of a second category is detected, displaying a warning message indicating a nature of the detected constraint and indicating a request for operator instruction; and (f) after step (e), if an operator instruction to proceed is received, submitting the print job to the selected printing device. The method may further include generating data for a banner page for the print job indicating uncompleted job requirements before submitting the print job to the selected printing device.

The first category of constraints may include incompatible color capabilities, incompatible paper size and type, incompatible layout capabilities, internally incompatible finishing requests, incompatible orientation requests, unsupported layout/size modifications, and unsupported media types. The second category of constraint may include incompatible finishing capabilities.

In another aspect, the present invention provides a computer program product including a computer usable medium having a computer readable code embodied therein for controlling a data processing apparatus for managing a plurality of printing devices, the computer readable program code being configured to cause the data processing apparatus to execute the above process for processing a print job.

It is to be understood that both the foregoing general description and the following detailed description are exemplary and explanatory, and are intended to provide further explanation of the invention as claimed.

BRIEF DESCRIPTION OF THE DRAWINGS

FIG. 3 illustrates an exemplary graphical user interface according to an embodiment of the present invention.

DETAILED DESCRIPTION OF THE PREFERRED EMBODIMENTS

Figure 1:
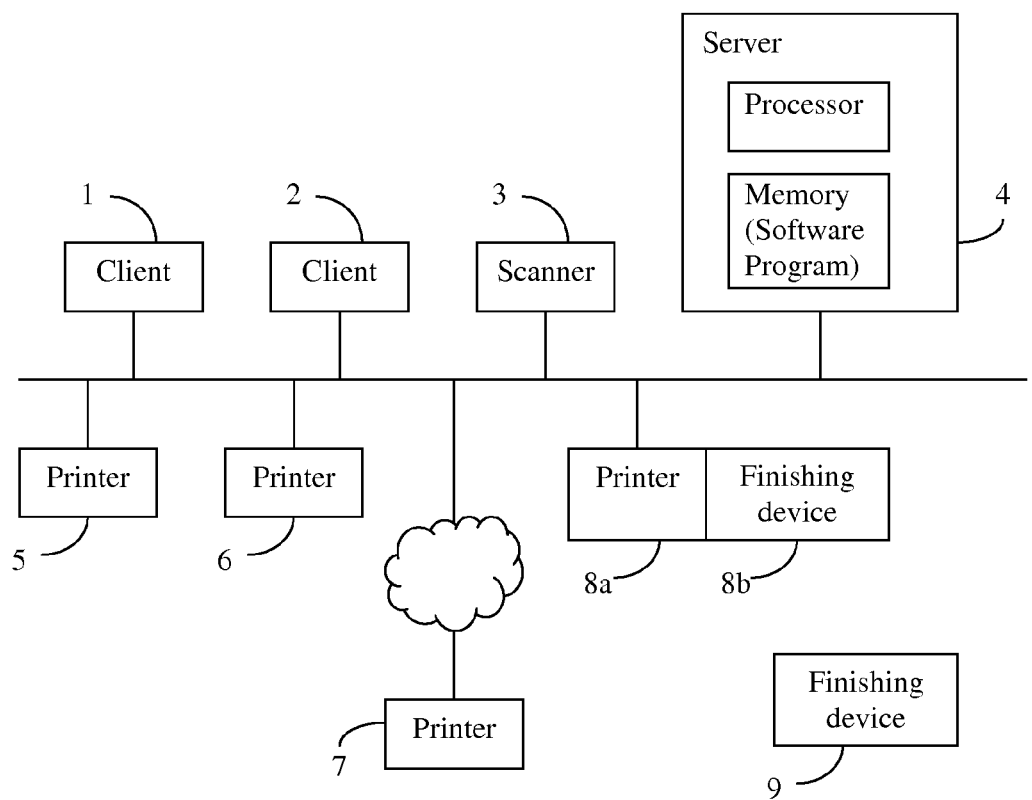
FIG. 1 schematically illustrates a print management system having multiple printers, finishing devices and a print job management server in which embodiments of the present invention can be implemented.

Embodiments of the present invention provide a method for assisting an operator of a print shop to assign print jobs to appropriate printing devices. FIG. 1 illustrates an example of a print shop having multiple printers, where embodiments of the present invention may be implemented. In the print shop system, client computers 1 and 2 are connected to a server 4 via a local area network (LAN). Scanner 3 is also optionally connected to server 4 via the LAN. In this example, B&W printers 5 and color printers 6 (only one each is drawn in FIG.

1 to avoid overcrowding) are connected to the server through the LAN. In this example, printers 5-6 are commercial standard high-end printers that can handle high speed, high quality printing. Each of the printers 5-6 has multiple paper trays to store paper of various sizes, color, and types. Further, some of the printers 5-6 are equipped with an output sorting mechanism with multiple output trays to perform collate printing or other print finishing functions. A printer 8a is explicitly shown as having an associated finishing device 8b. Another printer 7 is shown as being connected over a network. Each printer has one or more display monitors to display the status of the printing and various warning and instruction messages to a user. Each printer is equipped with its own central processing unit (CPU) and appropriate hardware/software to control its own printing operations, and communicates with server 4 via a LAN. Some of these printers may also be multifunction printers that can perform copying and scanning of documents. Appropriate server software is installed in server 4 to perform various standard network administrative functions.

FIG. 1 also illustrates an offline finishing device 9. An offline finishing device is typically manually operated by an operator. For example, an operator can take a stack of printed sheet to an offline binding machine to make a booklet.

According to embodiments of the present invention, in addition to the server administrative software, print job management software is installed on server 4 for managing a large number of print jobs that come into the print shop. The print job management software may be stored in either of a read only memory (ROM) or a hard disk drive (HDD), which can be accessed by the CPU of the server 4. Once a print shop operator calls the print job management software, server 4 reads out the print job management software from the ROM or HDD to a random access memory (RAM) of the server to carry out various functions of the software, including management of print jobs. The print job management software preferably is designed to run on Windows OS, Macintosh OS, or Unix X Windows or other computer operating systems implementing a GUI (graphic user interface), such as a touch-screen and/or a mouse and a keyboard, coupled with a display monitor. Server 4 (or any suitable data processing apparatus) running print job management software of embodiments of the present invention is hereinafter referred to as "print job management server." In this application, the terms "print job management server" and "print job management apparatus" broadly refer to any data processing apparatus that can implement various features of embodiments of the present invention described below with appropriate hardware/software.

A print job is a print request specifying various desired options or requirements together with one or more documents to be printed. For example, a customer may bring a storage device containing a file in the PDF format for printing with a particular finishing option. The print shop operator asks the customer what kind of print jobs is desired to figure out print job parameters. Alternatively, the customer may be asked to fill out a questionnaire sheet to describe what print options he/she desires. For example, the customer may desire that the document be printed on 24 lb 25% cotton letter size paper in full color in the double-sided printing mode in the amount of 100 copies. The print shop operator then records these job parameter values along with customer information as a file and stores the file and the source PDF file onto the hard disk drive or other secured storage device so that the print job parameters are associated with the file. Other ways that job tickets are generated include a customer submitting a print job request via a network (i.e. the Internet) by filling out a request form, Print jobs also may be generated by a customer's requests to copy a document. When a customer brings a document for copying, the shop operator scans the document using scanner 3 (which may be a color and/or B&W scanner) and converts the document into a digital file and thereafter creates a data file associated with the scanned source document in a manner similar to above.

Theses data files representing print jobs and associated files are forwarded to server 4. This way, numerous print jobs are generated and collected by server 4 on which print job management software is running. The print job management server 4 running print job management software receives the print job files, and analyzes and processes the print jobs. The print job management server can automatically submit print jobs to a printing device for printing and (if required) finishing. It can also make recommendations (via the GUI) to an operator as to which printing devices are suitable for handling a print job, so that the operator can assign the print job to a printing device based on the recommendation. Or, the operator can manually assign a print job to a printing device using the GUI of the print job management software, as will be explained in more detail later.

The printing devices to which the server 4 assigns print jobs include printers and clusters. A printer is an actual physical printer (which may include finishing functions such as stapling) that is connected to the server 4. A cluster is a software-defined virtual printing device designed to perform a certain class of print jobs more efficiently and accurately. It is a combination of two or more printers and (optionally) finishing devices with specified rules or algorithm. When a print job is assigned to a cluster, the print job is split into two or more jobs by a preset or user-defined rule or algorithm, and the divided jobs are processed by the respective printers and/or finishing devices designated by the cluster. For example, if a print job containing some color pages and some B&W pages is submitted to a cluster that combines a color printer and a B&W printer, the print job is divided into a first sub-job containing all color pages and a second sub-job that prints the Black & White pages and inserts the color pages (placed in a paper inserter tray) into the proper location in the document as the B&W pages are being printed. The sub-jobs are sent to the two printers for respective printing. The cluster may also include one or more finishing devices associated with its printers, for example, a hole puncher.

In embodiments of the present invention, print jobs are organized by using database entries, called "job tickets." A job ticket specifies values of various print job parameters, and associates itself to the source file(s). In one particular example, a job ticket may include a job ticket number, ticket name as well as the values of the following groups of various other job parameters: job information settings, basic settings, layout settings, cover sheet, finishing settings, inter-sheet settings, tab-paper settings, image quality settings, and customer information. Job information settings include job name, submit time, completed time, due date, type (print or copy), priority, the identity of the person who created the job ticket, job location, etc. Job information settings further include the directory pass at which the file containing the document to be printed is located in a local or networked hard drive, the number of B&W pages, the number of color pages, and special instructions. Basic settings include the number of copies to be made, the orientation of paper (portrait or landscape), information on collate printing, information on offset printing, the original paper size, the output paper size, the paper type, and paper source information, such as tray numbers. Layout settings include settings concerning print layout. Cover sheet includes settings on cover sheets to be produced or prepared. Finishing settings specify paper finishing settings, including the paper binding options, such as stitch, staple, and punch.

Based on instructions and information received from a customer, a print shop operator may manually enter the values of these job parameters using a job ticket editor, which is a graphic user interface (GUI). In addition, the server 4 may be configured to access and analyze the source file to determine the values of some of the job parameter directly from the source file. Then the server enters these values in the corresponding job parameter entries in the corresponding job ticket without requiring a user to manually enter them. This will help eliminate clerical errors and further facilitate the operation of the print shop.

In this application, the term "value" means, when referred to with respect to variables or parameters, any numerical quantity, characters, and other types of entries that can specify variables or parameters, and including, but not limited to, a specific setting of any of the job parameters appeared herein.

Each day, a print shop receives a large number of new print jobs specifying a variety of printing requirements. As arrived, these print jobs are not organized, yet they must be processed promptly and accurately. The print job management server can analyze incoming print jobs and make recommendations to the operator regarding which printing devices can handle the print job requirements. Such a method is described in commonly owned, co-pending U.S. patent application Ser. No. 11/395,520, filed on Mar. 31, 2006. The print job management server can also analyze incoming print jobs and automatically assigns them to the appropriate printing device for printing. Such a method is described in commonly owned, co-pending U.S. patent application Ser. No. 12/028,971, filed Feb. 11, 2008.

In addition to these print job assignment methods, the operator may also manually assign a print job to a printing device he chooses. In one implementation, the GUI of the print job management software displays a print job panel showing a list of print jobs to be printed, and one or more icons each representing a printing device (also referred to as a destination). The print job panel may also display groups of print jobs, each job group including one or more print jobs. The operator assigns a print job or a group of jobs to a printing device he chooses by dragging a print job from the print job panel to the destination icon for the printing device. Other GUI implementations can also be used to accomplish the manual job assignment.

Figure 2:
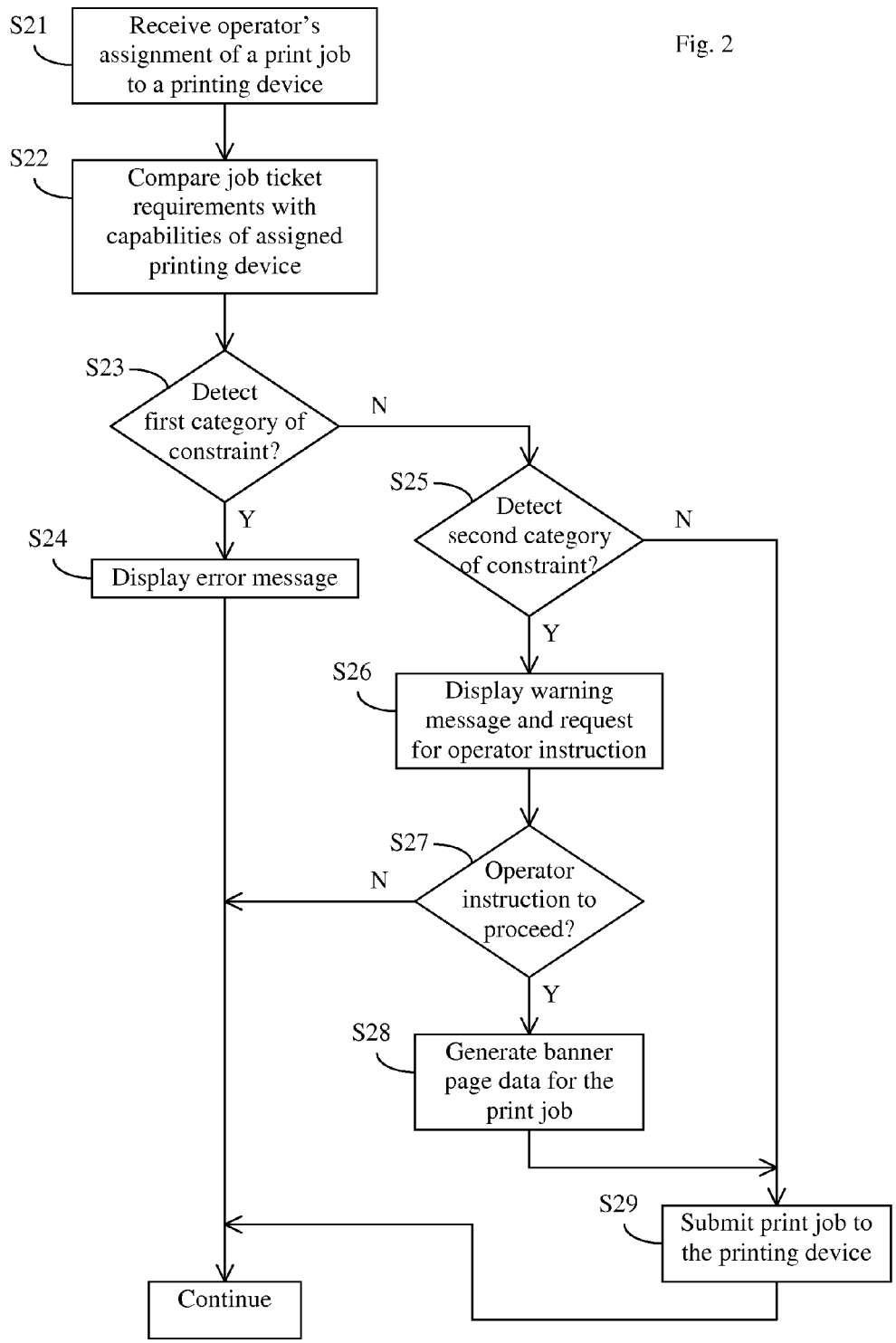
FIG. 2 illustrates a print job constraint check process according to an embodiment of the present invention.

When the operator assigns a print job to a printing device, there is a possibility that the printing device cannot support all of the job ticket requirements. Thus, according to an embodiment of the present invention, the print job management software performs a constraint check to ensure that the printing device selected by the user can properly handle the requirements of the print job. The print job constraint check process is illustrated in FIG. 2. After the operator assigns a print job to a printing device (step S21), the print job management software compares the job ticket settings of the print job with the capabilities of the printing device, which has been stored by the print job management software in a file such as an XML-based constraints file (step S22).

More specifically, an XML stream defines a set of constraints. The XML stream is parsed to define a set of constraints to be stored in the job ticket session. Each constraint has an error code and a set of features and their values. Each feature ID matches the name of a field within a sub-job ticket. The constraints XML can be validated against an XML schema. An example of the XML defining a set of constraints is given below:

```
<?xml version="1.0" encoding="utf-8"?>
<ConstraintList
    xmlns:xsi="http://www.w3.org/2001/XMLSchema-instance"
    xsi:noNamespaceSchemaLocation="Constraints.xsd">
  <Constraint ErrorCode="2">
    <Feature ID="OutputPaperSize" Value="A6"/>
    <Feature ID="PaperSource" Value="Tray1"/>
  </Constraint>
  <Constraint ErrorCode="3">
    <Feature ID="OutputPaperSize" Value="A6"/>
    <Feature ID="PaperSource" Value="Tray2"/>
  </Constraint>
</ConstraintList>
```

When the set of constraints is checked against the fields of a sub-job ticket object, any constraints that are triggered are reported as XML. An example of what the XML is given below:

```
<?xml version="1.0" encoding="utf-8"?>
<Response>
  <Error code="2">
    <Feature ID="OutputPaperSize" Value="A6"/>
    <Feature ID="PaperSource" Value="Tray1"/>
  </Error>
  <Error code="3">
    <Feature ID="OutputPaperSize" Value="A6"/>
    <Feature ID="Duplex" Value="Long Edge Binding"/>
  </Error>
</Response>
```

Each "Error" element corresponds to a constraint that triggered. Each "Feature" child element corresponds to a feature in the constraint and a field in the sub-job ticket. Of course, the above examples are merely illustrative and are not intended to be limiting. Any suitable implementation may be adopted.

Constraints (i.e. incompatibilities between the capability of the printing device and the print job requirements) may fall into two categories. The first category includes constraints that must be corrected in order for the jobs to print. For example, if the printing device selected by the operator is a black and white printer, but the print job includes some color pages, then the printing cannot proceed. Other examples include incompatible paper size or paper type, incompatible layout capabilities, internally incompatible finishing requests within the job ticket (fold, staple, punch, perfect binding), incompatible orientation requests, unsupported layout/size modifications, unsupported media types (envelopes, letterhead, labels), etc. The second category includes constraints that, if ignored, would not prevent the job from printing on the selected printing device. For example, if the print job includes certain finishing requirements, for example hole punching, but the printing device selected by the operator is not equipped with a required finishing device (a hole puncher in this example), then the operator may choose to proceed with the printing, but will need to take additional steps to complete the finishing requirements offline (by using an offline hole puncher in this example).

In step S22, the capabilities of a cluster depend on the capabilities of the individual printers in the cluster and the algorithm that define how they share tasks. For example, for a cluster that includes a B&W printer and a color printer, with an algorithm specifying how the color and B&W pages of a print job is to be printed by the two printers, the cluster is considered to have a color printing capability for purpose of step S22. In another example, a quantity-type cluster includes a number of B&W printers with an algorithm specifying how multiple copies of a print job is to be printed by the number of printers. If the print job requires hole-punching but not all of the printers in the cluster have hole-punching capabilities, then the cluster cannot support the hole-punching requirement of the job.

If the print job management software detects a constraint of the first category ("Y" in step S23), the software displays an error message indicating the nature of the constraint and indicating that printing cannot proceed (step S24). The print job will not proceed, and the process continues (e.g. wait for next print job assignment by the operator). If the print job management software does not detect a constraint of the first category ("N" in step S23) but detects a constraint of the second category ("Y" in step S25), the software displays a warning message indicating the nature of the constraint, along with a request for an instruction from the operator about whether to proceed with printing (step S26). The warning message and error message may be displayed in different colors (e.g. blue for the warning message and red for the error message).

At this time, the operator may decide to proceed with printing or not to proceed with printing. If an operator instruction not to proceed is received from the operator ("N" in step S27), printing will not proceed and the process continues. If an operator instruction to proceed with printing is received ("Y" in step S27), the software generates data for a banner page to indicate the uncompleted job requirements, such as finishing requirements that must be performed offline (step S28). A banner page, as a part of the print job to be submitted to the printer, is a cover page that will be printed and outputted on the top of the stack of printed sheets of the print job. The banner page may contain any desired information, and in this case, it will contain instructions to the operator regarding the uncompleted job requirements. The print job management software then submits the print job to the printing device for printing (step S29). In this case, the print job will include the banner page with the instructions regarding uncompleted job requirements.

If in steps S23 and S25 the print job management software does not detect any constraints ("N" in step S23 and "N" in step S25), i.e., the selected printing device is fully capable of handling all job requirements, then no error or warning message is displayed and the software submits the print job to the printing device for printing (step S29). In this case, the banner page (if any) will not contain any instruction regarding uncompleted job requirements.

Figure 3:
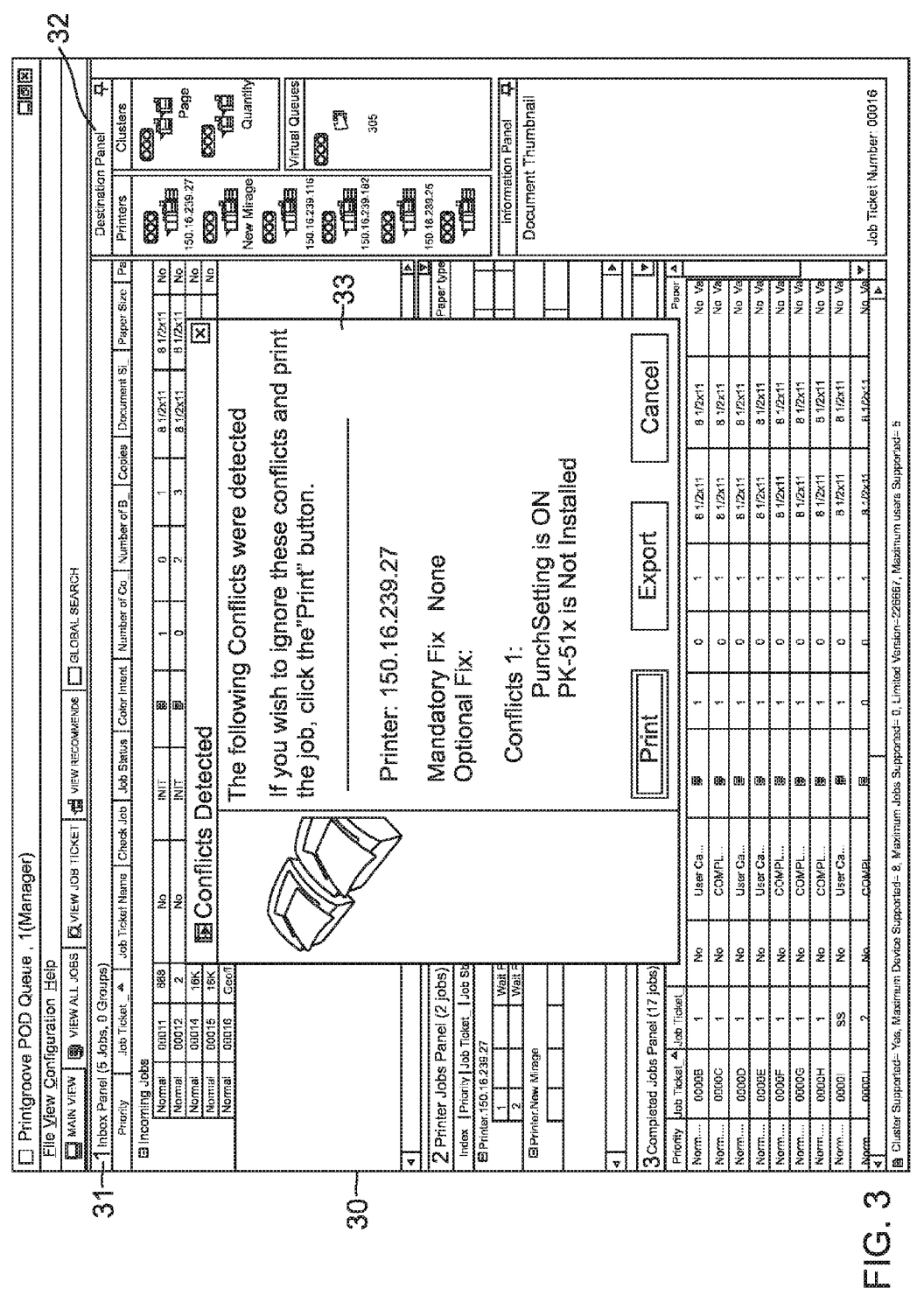

FIG. 3 illustrates an exemplary graphical user interface of the print job management software. The interface window 30 includes, among other things, an inbox panel that lists all print jobs to be processed and a destination panel 32 containing a plurality of icons representing printers and clusters (virtual printing devices). A message window 33 is shown, which in this particular example occurs as a result of step S26 and displays a warning message stating that there is no "Mandatory Fix" and one "Optional Fix." The nature of the optional fix ("Conflicts 1") indicated in this example is that the print job has a punch setting turned ON but a punch device is not installed on the selected printer. The warning message also reminds the operator that he can click the "Print" button (at the bottom of the message window 33) if he wishes to ignore the conflict. At this point, the operator may click the "Print" button to proceed with printing or click the "Cancel" button to cancel the print job assignment.

The process shown in FIG. 2 can be used when the operator assigns a group of print jobs to a printing device. A group is a holding folder that has one or more job ticket parameters associated with it. The purpose of a group is to collect multiple print jobs that share the same pre-defined characteristics and then batch process them at one time, when there are enough jobs. When the operator assigns a group to a printing device, the constraint check process shown in FIG. 2 is performed. If conflicts (constraints) are detected for any of the jobs in the group, an error or warning message is displayed. In the appended claims, the term "print job" should be understood to broadly include a group of individual print jobs.

An advantage of the constraint check process described above is that is allows the print job management software to support both inline and offline finishing, and the choice for using offline finishing is given to the operator via the warning message.

While the embodiments have been described as being applied in a print shop environment, the invention is not limited to any physical setting of a shop or network, and can be applied to a print shop system having a distributed setting where printers at different locations are connected to a server. In particular, it should be apparent that one or more of the components of the print shop system can communicate with the rest of the system via virtual private network (VPN) or similar means through the Internet. Moreover, referring to FIG. 1, although the server 4 of the above examples functions as the print job management server as well as the network server, a separate stand-alone computer may be provided to run the print job management software. In the alternative, when properly configured, one of the client computers 1 and 2 or the computers attached to one of the printers 5-8 (if such a printer exists among them) may be used to assume the role of the print job management server. Further, although a Windows based server computer with appropriate software has been described above as an example, a print management system of the present invention can be implemented in a proprietary hardware system that is specifically designed to perform the above-described various functionalities of the print management system.

It will be apparent to those skilled in the art that various modification and variations can be made in the print job constraint check method and apparatus of the present invention without departing from the spirit or scope of the invention. Thus, it is intended that the present invention cover modifications and variations that come within the scope of the appended claims and their equivalents.

What is claimed is:

1. A method for processing a print job implemented in a print job management apparatus for managing a plurality of printing devices, the method comprising:
   (a) receiving an assignment of a print job to a selected printing device, the print job specifying job ticket parameters representing printing requirements;
   (b) comparing the printing requirements with capabilities of the selected printing device which include color capabilities, media supply capabilities, layout capabilities, and finishing capabilities, to detect whether any constraints of a first category exists, the constraints of the first category being selected from a group consisting of incompatible color capabilities, incompatible paper size and type, incompatible layout capabilities, finishing requests that are internally incompatible with each other, incompatible orientation requests, unsupported layout/size modifications, and unsupported media types, and to detect whether any constraints of a second category exists, the constraints of the second category being finishing requests that are incompatible with finishing capabilities of the selected printing device, wherein the constraints of the first category and the constraints of the second category are non-overlapping;

(c) if neither any constraint of the first category nor any constraint of the second category is detected in step (b), submitting the print job to the selected printing device;

(d) if any constraint of the first category is detected in step (b), regardless of whether any constraint of the second category is detected in step (b), displaying an error message indicating that printing fails to proceed and indicating a nature of the detected constraint, without submitting the print job to the selected printing device;

(e) if no constraint of the first category is detected and any constraint of the second category is detected in step (b), displaying a warning message indicating a nature of the detected constraint and indicating a request for operator instruction; and (f) after step (e), if an operator instruction to proceed is received, generating data for a banner page which indicates uncompleted job requirements, generating a modified print job which includes the banner page containing the data indicating the uncompleted job requirements and the received print job, and submitting the modified print job which includes the banner page and the received print job as a single print job to the selected printing device to print the banner page together with pages of the received print job.

2. The method of claim 1, wherein the error message and the warning message are displayed using different colors.

3. The method of claim 1, further comprising:
storing capabilities of each of the plurality of printing devices in an Extensible Markup Language (XML) file.

4. A computer program product comprising a computer usable non-transitory storage medium having a computer readable code embodied therein for controlling a data processing apparatus for managing a plurality of printing devices, the computer readable program code being configured to cause the data processing apparatus to execute a process for processing a print job, the process comprising:

(a) receiving an assignment of a print job to a selected printing device, the print job specifying job ticket parameters representing printing requirements;

(b) comparing the printing requirements with capabilities of the selected printing device which include color capabilities, media supply capabilities, layout capabilities, and finishing capabilities, to detect whether any constraints of a first category exists, the constraints of the first category being selected from a group consisting of incompatible color capabilities, incompatible paper size and type, incompatible layout capabilities, internally incompatible finishing requests that are internally incompatible with each other, incompatible orientation requests, unsupported layout/size modifications, and unsupported media types, and to detect whether any constraints of a second category exists, the constraints of the second category being incompatible finishing requests that are incompatible with finishing capabilities of the selected printing device, wherein the constraints of the first category and the constraints of the second category are non-overlapping;

(c) if neither any constraint of the first category nor any constraint of the second category is detected in step (b), submitting the print job to the selected printing device;

(d) if any constraint of the first category is detected in step (b), regardless of whether any constraint of the second category is detected in step (b), displaying an error message indicating that printing fails to proceed and indicating a nature of the detected constraint, without submitting the print job to the selected printing device;

(e) if no constraint of the first category is detected and any constraint of the second category is detected in step (b), displaying a warning message indicating a nature of the detected constraint and indicating a request for operator instruction; and (f) after step (e), if an operator instruction to proceed is received, generating data for a banner page which indicates uncompleted job requirements, generating a modified print job which includes the banner page and the received print job, and submitting the modified print job which includes the banner page containing the data indicating the uncompleted job requirements and the received print job as a single print job to the selected printing device to print the banner page together with pages of the received print job.

5. The computer program product of claim 4, wherein the error message and the warning message are displayed using different colors.

6. The computer program product of claim 4, wherein the process further comprises:
storing capabilities of each of the plurality of printing devices in an Extensible Markup Language (XML) file.

\* \* \* \* \*